United States Patent
Nagasawa et al.

(10) Patent No.: US 7,190,281 B2
(45) Date of Patent: Mar. 13, 2007

(54) VEHICLE ENVIRONMENT MONITORING DEVICE, VEHICLE ENVIRONMENT MONITORING METHOD, CONTROL PROGRAM AND COMPUTER-READABLE RECORDING MEDIUM

(75) Inventors: Shunsuke Nagasawa, Kyoto (JP); Hidenori Sato, Fujieda (JP); Noriyuki Unno, Shizuoka (JP)

(73) Assignees: Sharp Kabushiki Kaisha, Osaka (JP); Murakami Corporation, Shizuoka (JP)

( * ) Notice: Subject to any disclaimer, the term of this patent is extended or adjusted under 35 U.S.C. 154(b) by 211 days.

(21) Appl. No.: 11/049,757

(22) Filed: Feb. 4, 2005

(65) Prior Publication Data
US 2005/0190952 A1 Sep. 1, 2005

(30) Foreign Application Priority Data
Feb. 6, 2004 (JP) .............................. 2004-031434

(51) Int. Cl.
*G08G 1/16* (2006.01)

(52) U.S. Cl. ....................... 340/903; 340/904; 340/937; 340/435; 340/436; 700/300; 700/301

(58) Field of Classification Search ................ 340/903, 340/904, 937, 425.5, 435, 436; 700/300, 700/301
See application file for complete search history.

(56) References Cited

U.S. PATENT DOCUMENTS 5,712,640 A * 1/1998 Andou et al. .................. 342/70

(Continued)

FOREIGN PATENT DOCUMENTS

JP 6-227318 A 8/1994

(Continued)

OTHER PUBLICATIONS

Okada R. et al; "Obstacle Detection Based on Motion Constraint of Virtual Planes" Proceedings of the 2002 IEEE/RSJ International Conference on Intelligent Robots and Systems (IROS) 2002. Lausanne, Switzerland, Sep. 30-Oct. 4, 2002, IEEE/RSJ International Conference on Intelligent Robots and Systems, New York, NY IEEE, US, vol. 1 of 3 Sep. 30, 2002, p. 61-66.

(Continued)

*Primary Examiner*—Daryl C Pope
(74) *Attorney, Agent, or Firm*—Birch, Stewart, Kolasch & Birch, LLP

(57) ABSTRACT

A vehicle environment monitoring device comprises an imaging section for taking image data of an environment of an automobile, the image including at least two types of colors; a setting section for setting a specific area of the image data obtained by the imaging section, wherein the specific area has a strip shape longer in, and parallel to, a horizontal direction of a frame image and includes at least two types of colors; an extraction section for taking in image data of the specific area in units of one or a plurality of frame images taken by the imaging section in time series and extracting moving vector information based on the image data of the specific area; and a detection section for detecting a second vehicle which is present in an environment of a first vehicle having the vehicle environment monitoring device mounted thereon, based on the moving vector information.

24 Claims, 10 Drawing Sheets

U.S. PATENT DOCUMENTS

| | | | | |
|---|---|---|---|---|
| 5,926,117 | A * | 7/1999 | Gunji et al. | 340/988 |
| 5,962,833 | A * | 10/1999 | Hayashi | 235/384 |
| 6,052,645 | A * | 4/2000 | Harada | 701/212 |
| 6,114,951 | A * | 9/2000 | Kinoshita et al. | 340/436 |
| 6,246,955 | B1 * | 6/2001 | Nishikawa et al. | 701/117 |
| 6,360,170 | B1 * | 3/2002 | Ishikawa et al. | 701/300 |
| 6,704,434 | B1 * | 3/2004 | Sakoh et al. | 382/104 |

FOREIGN PATENT DOCUMENTS

| | | |
|---|---|---|
| JP | 7-239998 A | 9/1995 |
| JP | 8-110207 A | 4/1996 |
| JP | 10-11585 A | 1/1998 |
| JP | 2000-20686 A | 1/2000 |
| JP | 2000-285245 | 10/2000 |
| JP | 2000-285393 A | 10/2000 |
| JP | 2001-357402 A | 12/2001 |

OTHER PUBLICATIONS

Techmer A. et al; "A 100 GOPS Vision Platform for Intelligent Vehicles" Intelligent Vehicles Symposium 2003, Proceedings, IEEE Jun. 9-11, 2003, Piscathaway, NJ, USA, IEEE, pp. 114-119.

Aoki M; "Imaging and Analysis of Traffic Scene", Image Processing Proceedings, 1999 International Conference on Kobe, Japan Oct. 24-28, 1999, Piscathaway, NJ, USA, IEEE, US, vol. 4, pp. 1-5.

* cited by examiner

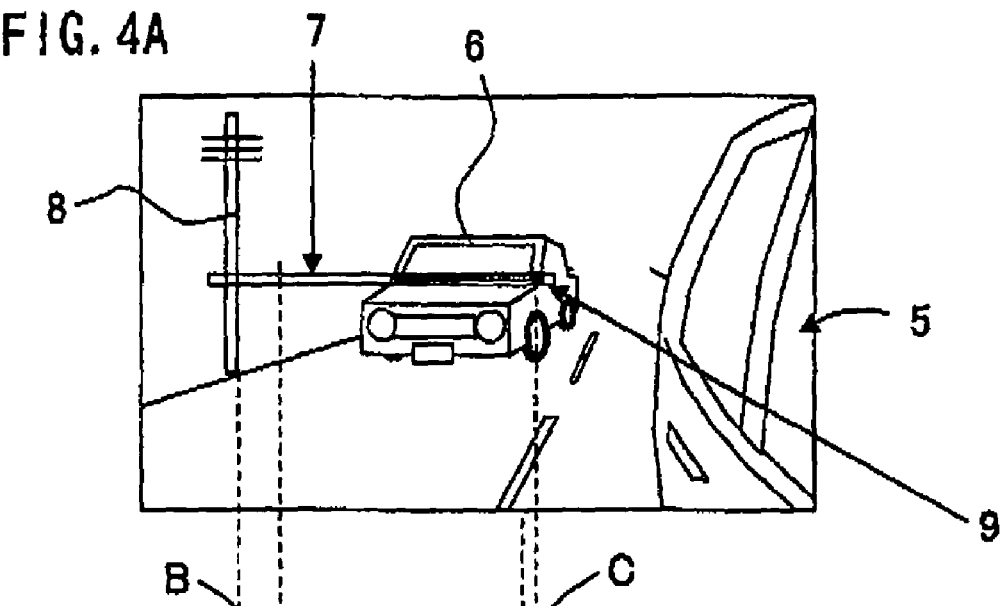
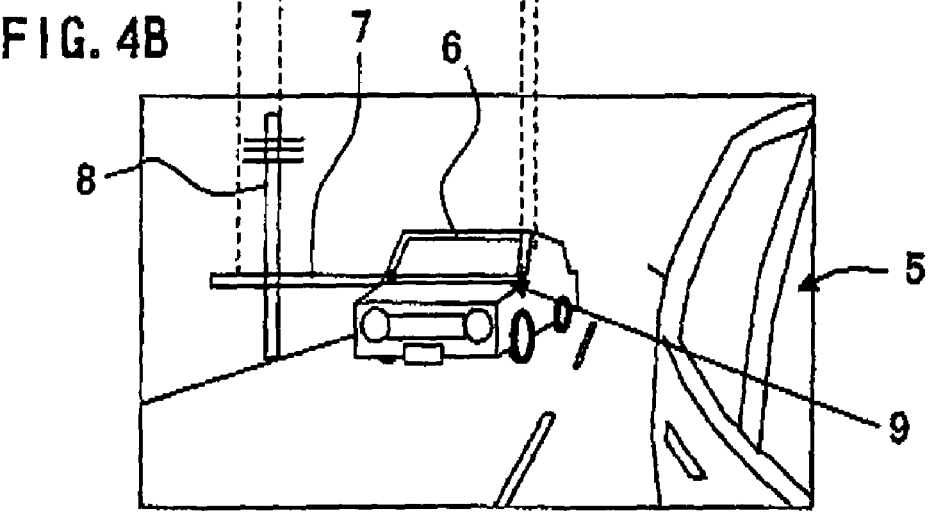

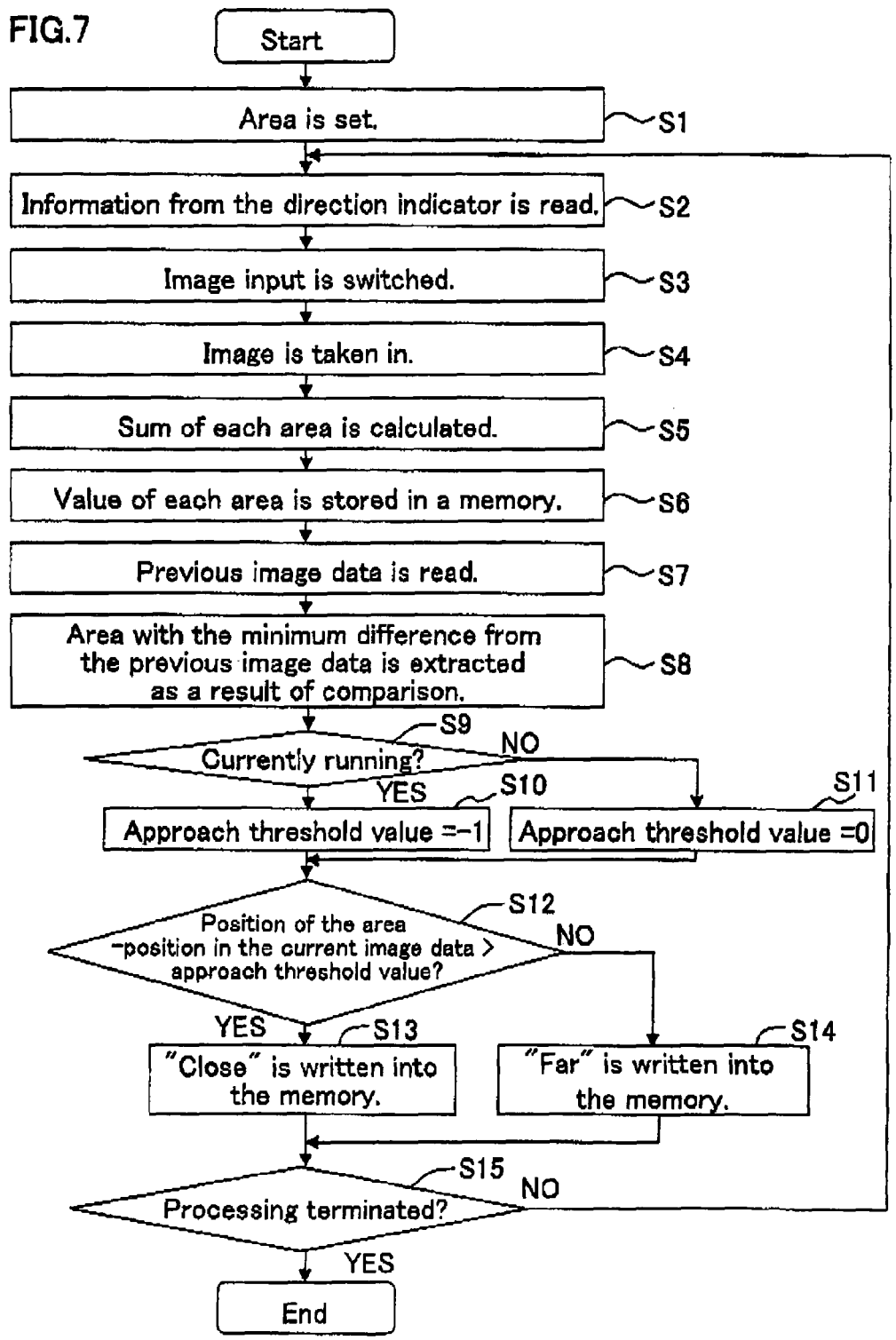

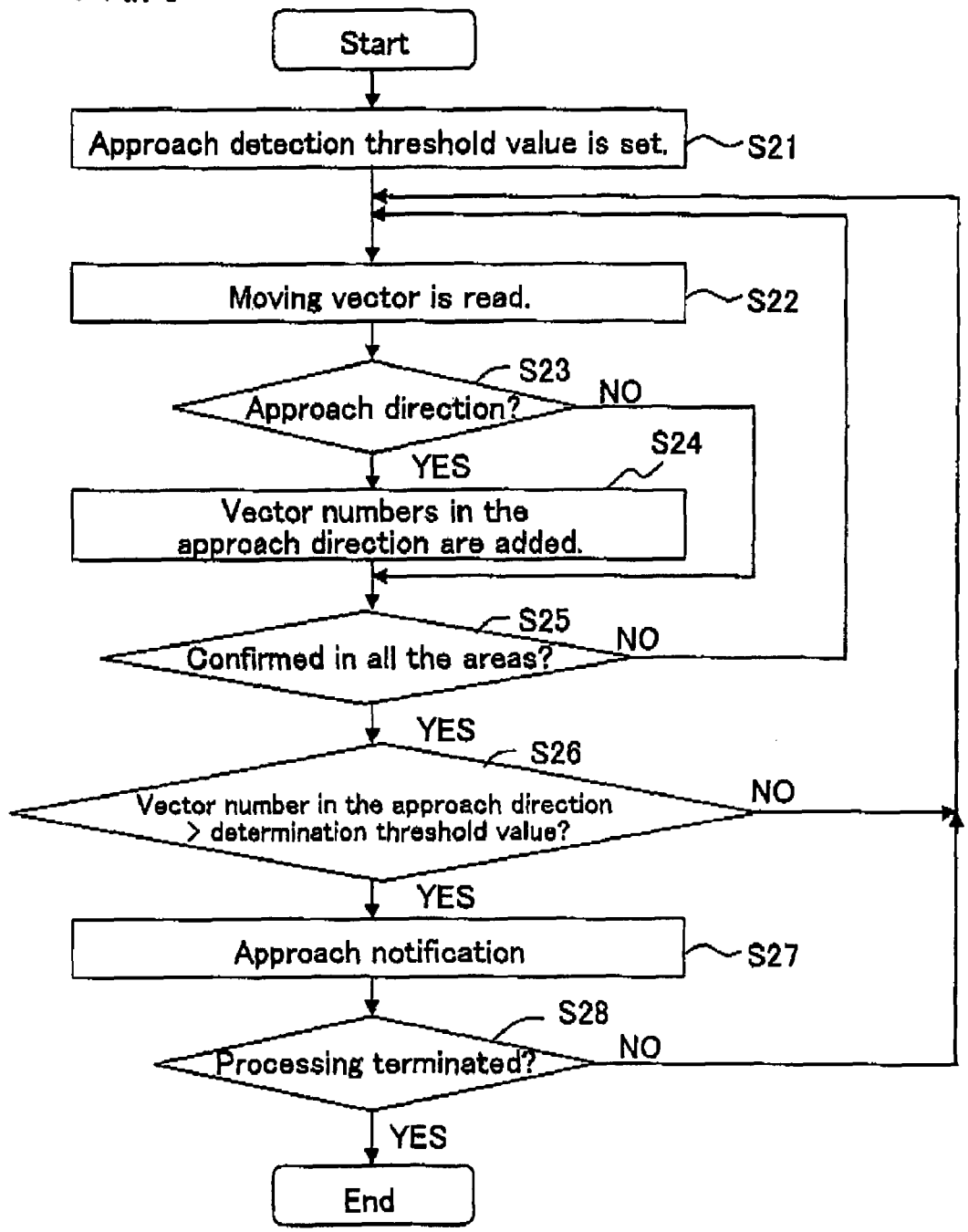

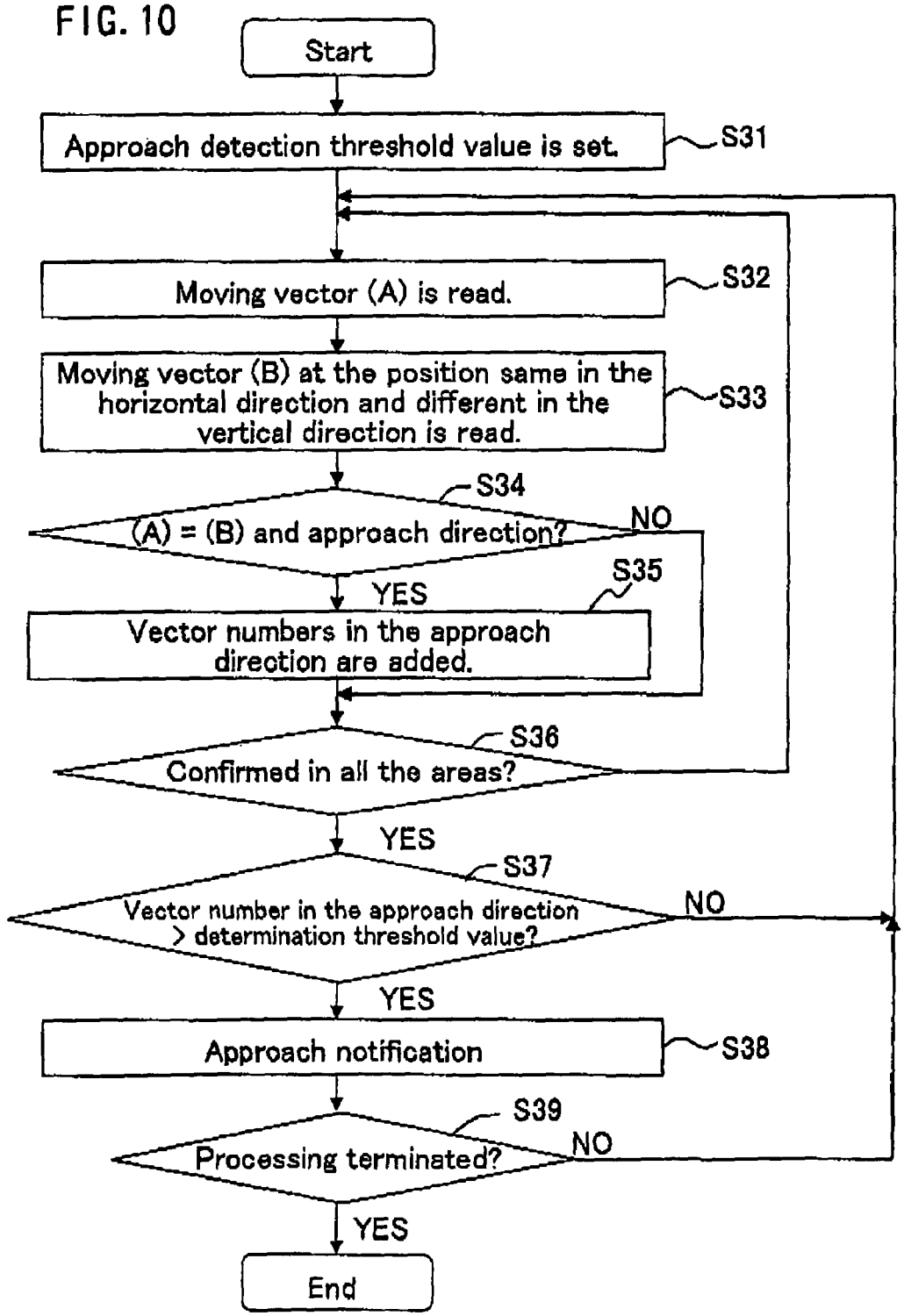

E

VEHICLE ENVIRONMENT MONITORING DEVICE, VEHICLE ENVIRONMENT MONITORING METHOD, CONTROL PROGRAM AND COMPUTER-READABLE RECORDING MEDIUM

This non-provisional application claims priority under 35 U.S.C., §119(a), on Patent Application No. 2004-031434 filed in Japan on Feb. 6, 2004, the entire contents of which are hereby incorporated by reference.

BACKGROUND OF THE INVENTION

1. Field of the Invention

The present invention relates to a vehicle environment monitoring device usable for performing monitoring for safety when a two-wheel vehicle such as a motorbike or a bicycle, or a four-wheel vehicle such as an automobile, which has the vehicle environment monitoring device mounted thereon moves; for example, usable for, when such a vehicle moves right or left for the purpose of turning left or turning right or for changing lanes, notifying the driver of the vehicle by means of an alarm that there is a danger of the vehicle contacting or colliding against another vehicle present in the environment thereof and thus supporting safety confirmation; a vehicle environment monitoring method using the same; a control program for causing a computer to carry out the vehicle environment monitoring method; and a computer-readable recording medium having the control program recorded thereon.

2. Description of the Related Art

Recently, the increase of traffic accidents such as contact or collision of automobiles or other vehicles is a serious social problem. Especially, contact or collision often occurs when the vehicle moves right or left for changing lanes, turning right, or turning left although the driver pays attention. Many contact or collision accidents are considered to occur for the reasons of, for example, (i) the driver of the vehicle cannot sufficiently check the environment behind and beside the vehicle using a side mirror or the like, and (ii) there are other vehicles at the so-called blind spot which is not reflected on the side mirror or the like.

In order to prevent such traffic accidents, for example, Japanese Laid-Open Publication No. 2000-285245 discloses a vehicle collision prevention device including notification means for taking images of the environment behind the vehicle by a camera mounted on the vehicle, detecting the presence of another vehicle from the taken images, alarming and notifying the driver that another vehicle is approaching when there is a danger of the vehicle contacting or colliding against the another vehicle coming from behind when the vehicle is moving right or left for the purpose of changing lanes, turning right or turning left.

With this vehicle collision prevention device, from each of a plurality of frame images which were taken in time series by imaging means, straight line edges which form a white line present on the road on which the vehicle is running or a ridge line of the road, and an extinction point (infinite far point) which is an intersection of the straight line edges are detected. Based on the information on the positions of the white line, the ridge line, and the extinction point, a detection area is restricted. A moving amount between frame images of a small area (block) which is obtained by dividing the detection area is calculated by a technique referred to as a "optical flow". In this case, the detection area is area a represented by oblique lines in FIG. 11, which is about a half of the image plane. Information on the moving amount which is calculated in this manner is used for detecting, for example, another vehicle which is approaching rapidly from behind the vehicle so as to pass the vehicle.

However, the conventional vehicle collision prevention device disclosed in the above-identified publication has the following problems.

A white line is detected in order for checking the lane while the vehicle is running, and an extinction point is obtained for finding a moving direction of an object. Moreover, an optical flow is used for checking how each block obtained by dividing the detection area moves. Therefore, highly sophisticated calculations are required. In addition to the problem regarding the quality of such highly sophisticated calculations, the calculation amount is very large because the image area E represented by the oblique lines in FIG. 11 is as large as about a half of the image plane.

Because the calculation amount is very large, real-time processing is impossible. In order to compensate for this, a method of, for example, calculating a moving amount by unit time for estimation is used. This makes it impossible to accurately detect the moving direction of another vehicle, and errors are likely to occur. In addition, there are other problems that, for example, some roads do not have white lines and therefore the moving amount of the object cannot be calculated. For these reasons, the above-described vehicle collision prevention device is not practical.

SUMMARY OF THE INVENTION

According to one aspect of the invention, a vehicle environment monitoring device comprises an imaging section for taking image data of an environment of an automobile, the image including at least two types of colors; a setting section for setting a specific area of the image data obtained by the imaging section, wherein the specific area has a strip shape longer in, and parallel to, a horizontal direction of a frame image and includes at least two types of colors; an extraction section for taking in image data of the specific area in units of one or a plurality of frame images taken by the imaging section in time series and extracting moving vector information based on the image data of the specific area; and a detection section for detecting a second vehicle which is present in an environment of a first vehicle having the vehicle environment monitoring device mounted thereon, based on the moving vector information.

In one embodiment of the invention, the specific area including the two types of colors encompasses a border between a windshield and a hood of the second vehicle.

In one embodiment of the invention, the imaging section is attached to the first vehicle.

In one embodiment of the invention, the imaging section is attached to such a position that the imaging section is capable of taking an image of at least one of a left rear environment and a right rear environment of the first vehicle.

In one embodiment of the invention, the vehicle environment monitoring device further comprises an input image switching section switchable to select either image data from a right side imaging section or image data from a left side imaging section, and supplying the selected image data to the extraction section.

In one embodiment of the invention, the setting section sets the specific area of the image data obtained by the imaging section, such that the specific area does not encompass an image of the first vehicle and to encompass at least a part of the second vehicle.

In one embodiment of the invention, the extraction section compares a sum of current image data and a sum of previous image data before time t (t>0) for each of a plurality of divided areas obtained by dividing the specific area, extracting a divided area of the current image data and a divided area of the previous image data which have a minimum difference between the sums thereof, determining that the position of the extracted divided area of the previous image data is the position of the extracted divided area of the current image data time t before, and extracting a positional relationship between the extracted divided area of the previous image data and the extracted divided area of the current image data as the moving vector information.

In one embodiment of the invention, the extraction section compares a predetermined threshold value with the positional relationship between the extracted divided area of the previous image data and the extracted divided area of the current image data, thus determining whether the second vehicle in the divided areas is approaching, separating away from, or running at the same speed as, the first vehicle, and determining the moving vector information.

In one embodiment of the invention, the extraction section refers to vehicle speed information obtainable from the first vehicle to determine whether the first vehicle is running or not, and when the first vehicle is running, setting the predetermined threshold value to be lower than the threshold value when the first vehicle is not running.

In one embodiment of the invention, the detection section detects a relative moving state between the first vehicle and the second vehicle based on the moving vector information.

In one embodiment of the invention, the detection section is capable of detecting that the second vehicle is approaching the first vehicle based on the moving vector information.

In one embodiment of the invention, the detection section is capable of detecting that the second vehicle is running at the same speed as the first vehicle.

In one embodiment of the invention, the detection section reads the moving vector information of each of the plurality of divided areas, and when a sum of approach direction vector values, among the moving vector information, is larger than a predetermined threshold value, detecting that the second vehicle is approaching the first vehicle and/or the second vehicle is running at the same speed as the first vehicle.

In one embodiment of the invention, the vehicle environment monitoring device further comprises an approach notification section for outputting an alarm in accordance with a relative moving state between the first vehicle and the second vehicle, the relative moving state being detected by the detection section.

In one embodiment of the invention, the detection section detects whether or not there is the second vehicle approaching the first vehicle and/or the second vehicle running at the same speed as the first vehicle in a direction indicated by a direction indicator; and the approach notification section outputs an alarm to the environment of the first vehicle when the detection section detects that there is at least one of the second vehicle approaching the first vehicle and/or the second vehicle is running at the same speed as the first vehicle in the direction indicated by the direction indicator.

In one embodiment of the invention, the vehicle environment monitoring device further comprises a memory section for temporarily storing a result of the extraction performed by the extraction section, wherein the detection section reads the moving vector information from the memory section and uses the moving vector information for the detection.

In one embodiment of the invention, the extraction section includes a dividing section for dividing the image data of the specific area which has been taken in into a plurality of divided areas, wherein the image data of the specific area is either image data taken by a right side imaging section or image data taken by a left side imaging section which is selected by switching in accordance with a direction indicated by a direction indicator; a sum calculation section for calculating a sum of image data values of each of the plurality of divided areas: a divided area extraction section for extracting a divided area of the previous image data, a sum of which has a minimum difference from a sum of each of the plurality of divided areas of the current image data; a running determination section for determining whether the first vehicle is running or not based on vehicle speed information from the first vehicle; an approach threshold value setting section for setting one of two threshold values as a predetermined threshold value when the first vehicle is running, and setting the other threshold value as the predetermined threshold value when the first vehicle is not running; and a moving vector information determination section for comparing the predetermined threshold value with a positional relationship between the position of the extracted divided area of the previous image data and the position of the extracted divided area of the current image data; when a value of the positional relationship is larger than the predetermined threshold value, determining the moving vector information as approaching vector information; and when the value of the positional relationship is equal to or smaller than the predetermined threshold value, determining the moving vector information as separating vector information.

In one embodiment of the invention, the detection section includes a moving vector value calculation section for detecting whether the moving vector information indicates "close" or "far" in each of the plurality of divided areas, and when the moving vector information indicates "close", adding the moving vector information to vector values in an approach direction; and a second vehicle determination section for, when the sum of the vector values in the approach direction is larger than a determination threshold value, determining that there is the second vehicle approaching the first vehicle and/or there is the second vehicle running at the same speed as the first vehicle.

In one embodiment of the invention, the setting section sets a plurality of specific areas of the image data taken by the imaging section, wherein positions of the plurality of specific areas are the same in the horizontal direction and different in a vertical direction; the extraction section takes in the image data of each of the specific areas and extracting moving vector information; and the detection section adds vector values in an approach direction when the moving vector information in each of the plurality of specific areas represents the approach direction, and determining that there is at least one of the second vehicle approaching the first vehicle and the second vehicle running at the same speed as the first vehicle when a total sum of all the plurality of divided areas is larger than a predetermined threshold value.

According to another aspect of the invention, a vehicle environment monitoring method comprises an imaging step of taking image data of an environment of an automobile as frame images in time series, the image data including at least two types of colors; a setting step of setting a specific area of the image data in units of one or a plurality of frame images taken by the imaging section, wherein the specific area has a strip shape longer in, and parallel to, a horizontal direction of the frame images and includes at least two types of colors; an extraction step of taking in image data of the specific area in units of one or a plurality of frame images taken by the imaging section and extracting moving vector information based on the image data of the specific area; and a detection step of detecting a second vehicle which is present in an environment of a first vehicle having the vehicle environment monitoring device mounted thereon, based on the moving vector information.

In one embodiment of the invention, the extraction step includes the steps of taking in a direction indicated by a direction indicator; switching to select either image data taken by a right side imaging section or image data taken by a left side imaging section which corresponds to the direction which has been taken in; taking in the image area of the set specific area among the image data of the frame image selected by switching; dividing the specific area into a plurality of divided areas; calculating a sum of image data values of each of the plurality of divided areas; reading sum data stored in a memory section as previous image data time t before for each of the plurality of divided areas; comparing a sum of current image data and a sum of the previous image data, and extracting a divided area of the previous image data, a sum of which has a minimum difference from a sum of each of the plurality of divided areas of the current image data; determining whether the first vehicle is running or not based on vehicle speed information from the first vehicle; setting one of two threshold values as a predetermined threshold value when the first vehicle is running, and setting the other threshold value as the predetermined threshold value when the first vehicle is not running; and comparing the predetermined threshold value with a positional relationship between the position of the extracted divided area of the previous image data and the position of the extracted divided area of the current image data; when a value of the positional relationship is larger than the predetermined threshold value, determining the moving vector information as approaching vector information; and when the value of the positional relationship is equal to or smaller than the predetermined threshold value, determining the moving vector information as separating vector information.

In one embodiment of the invention, the detection step includes the steps of detecting whether the moving vector information indicates "close" or "far" in each of the plurality of divided areas, and when the moving vector information indicates "close", adding the moving vector information to vector values in an approach direction; and when the sum of the vector values in the approach direction is larger than a determination threshold value, determining that there is the second vehicle approaching the first vehicle and/or there is the second vehicle running at the same speed as the first vehicle.

According to a third aspect of the invention, a control program for causing a computer to carry out the above vehicle environment monitoring method is provided.

According to a fourth aspect of the invention, a computer-readable recording medium having the control program recorded thereon is provided.

The function of the present invention will be described.

According to the present invention, moving vector information can be extracted based on the image data of a plurality of frames without finding an extinction point or a white line, or using a technique of optical flow as required by the conventional art. Based on the vector information, the moving state of a second vehicle which is present in an environment (for example, right rear or left rear) of the first vehicle can be detected.

Since the moving state of the second vehicle can be detected without using highly sophisticated calculation processing and with a small amount of calculations, a vehicle environment monitoring device can be produced at low cost without using, for example, an expensive CPU capable of high speed processing. Since real-time processing is possible with a small amount of calculations, it is not necessary to calculate and estimate the moving amount by unit time, and therefore the detection accuracy can be improved.

By performing detection processing among a plurality of frames based on image data of a specific area which is strip-shaped and longer in, and parallel to, the horizontal direction of the frame image, errors due to noise or the like can be reduced, and thus the detection accuracy can be further improved. By encompassing at least two types of colors in the specific area, the divided areas of the specific area can be prevented from having one, fixed color, and thus the sum of the areas is prevented from being the same. Thus, each sum can be relatively large. Therefore, extraction of a wrong image position time t before can be prevented. Especially, it is preferable to encompass a border between the windshield and the hood of the second vehicle in the specific area. By setting a plurality of specific areas, wrong detection or the like due to the difference in size or shape among the second vehicles as the target of detection is reduced, which can further improve the detection accuracy.

By using vehicle speed information, it is possible to determine whether the vehicle is currently running or not. The state in which the first and second vehicles are at a stop can be distinguished from the state in which the first and second vehicles are running at the same speed. Thus, it is possible to detect a vehicle running at the same speed. By association with a direction indicator, an alarm or the like is output only when necessary to notify the driver or the like of danger.

As described above, according to the present invention, the detection area can be limited to a specific area. A second vehicle which is present, for example, right rear or left rear of the moving direction can be detected without finding an extinction point, a white line or the like. Real-time processing can be performed with a small amount of calculations, which can improve the detection accuracy.

The environment of the first vehicle can be monitored so as to check by an imaging section such as a camera or the like whether there is a second vehicle which is approaching to the first vehicle in the direction of movement (e.g., right or left) of the first vehicle for, for example, turning right or turning left. When there is a danger of contact or collision, an alarm or the like can be output to notify the driver or the like of the danger. Therefore, the present invention is effective for preventing collision accidents from occurring due to failure in visual or other types of confirmation.

Thus, the invention described herein makes possible the advantages of providing a vehicle environment monitoring device capable of performing highly accurate real-time detection of a moving state of another vehicle in the environment of a vehicle having the vehicle environment monitoring device mounted thereon, a vehicle environment monitoring method using the same, a control program for causing a computer to execute the vehicle environment monitoring method, and a computer-readable recording medium having the control program recorded thereon.

These and other advantages of the present invention will become apparent to those stilled in the art upon reading and understanding the following detailed description with reference to the accompanying figures.

BRIEF DESCRIPTION OF THE DRAWINGS

FIG. 4A schematically shows an image of the environment of the vehicle having the vehicle environment monitoring device mounted thereon taken by an imaging section shown in FIG. 1 when another vehicle is approaching.

FIG. 4B schematically shows an image of the environment of the vehicle having the vehicle environment monitoring device mounted thereon taken by the imaging section shown in FIG. 1 time t after the image of FIG. 4A when the vehicle moved forward.

FIG. 7 is a flowchart illustrating exemplary extraction processing of moving vector information performed by an image processing section shown in FIG. 1.

FIG. 8 is a flowchart illustrating exemplary detection processing of a relative moving state between the vehicle having the vehicle environment monitoring device mounted thereon and another vehicle performed by an approach detection section shown in FIG. 1.

FIG. 10 is a flowchart illustrating exemplary approach detection processing performed by the approach detection section shown in FIG. 1 when the plurality of specific areas are set as in FIGS. 9A and 9B.

DESCRIPTION OF THE PREFERRED EMBODIMENTS

Hereinafter, a vehicle environment monitoring device and a vehicle environment monitoring method using the same according to the present invention will be described in detail by way of illustrative examples with reference to the accompanying drawings. In the following description, an automobile is used as an example of the vehicle, but the present invention is not limited to automobiles and is applicable to trucks, freight cars, two-wheel vehicles such as motorbikes and bicycles.

Figure 1:
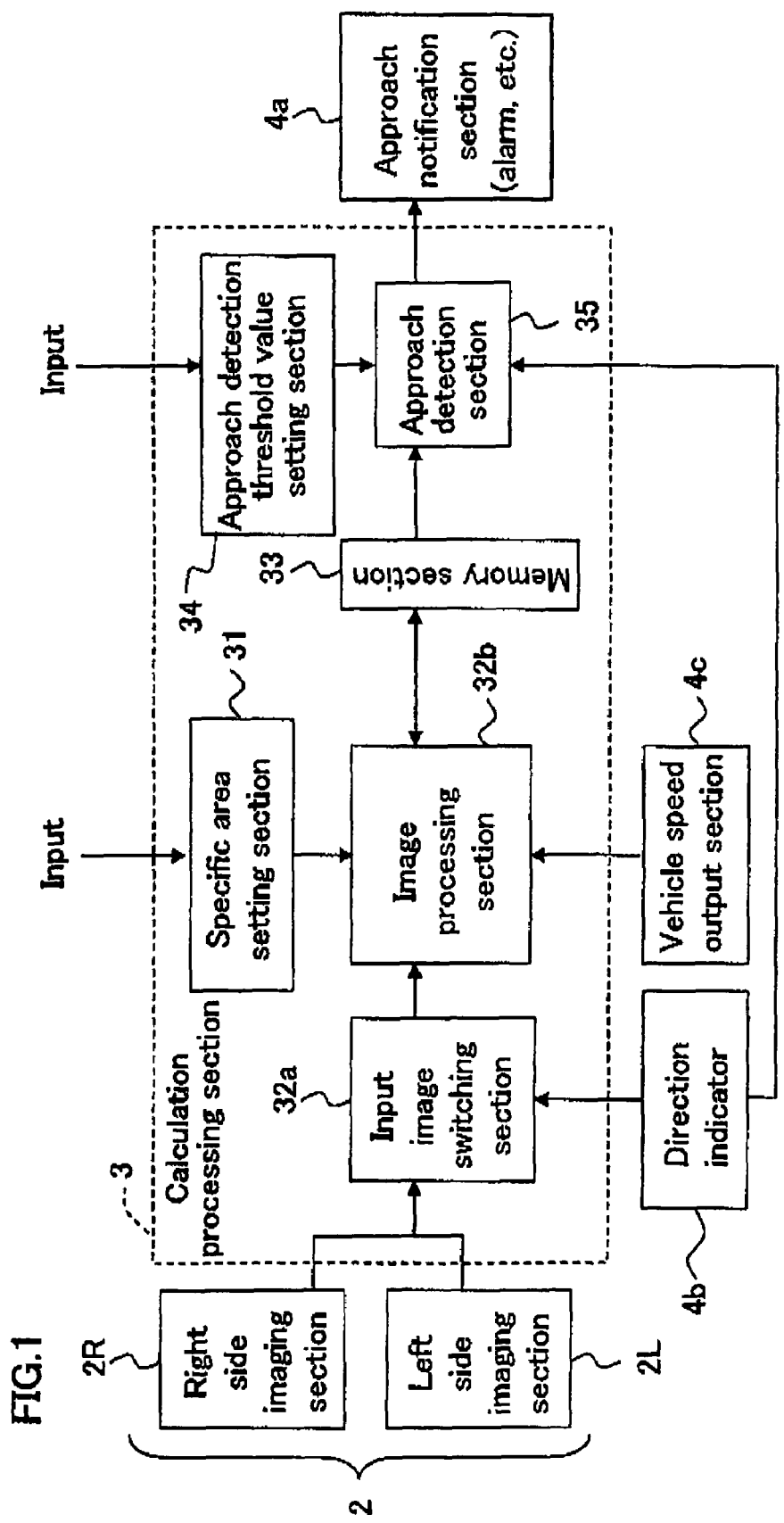
FIG. 1 is a block diagram showing a partial structure of a vehicle environment monitoring device according to an example of the present invention.
Figure 2:
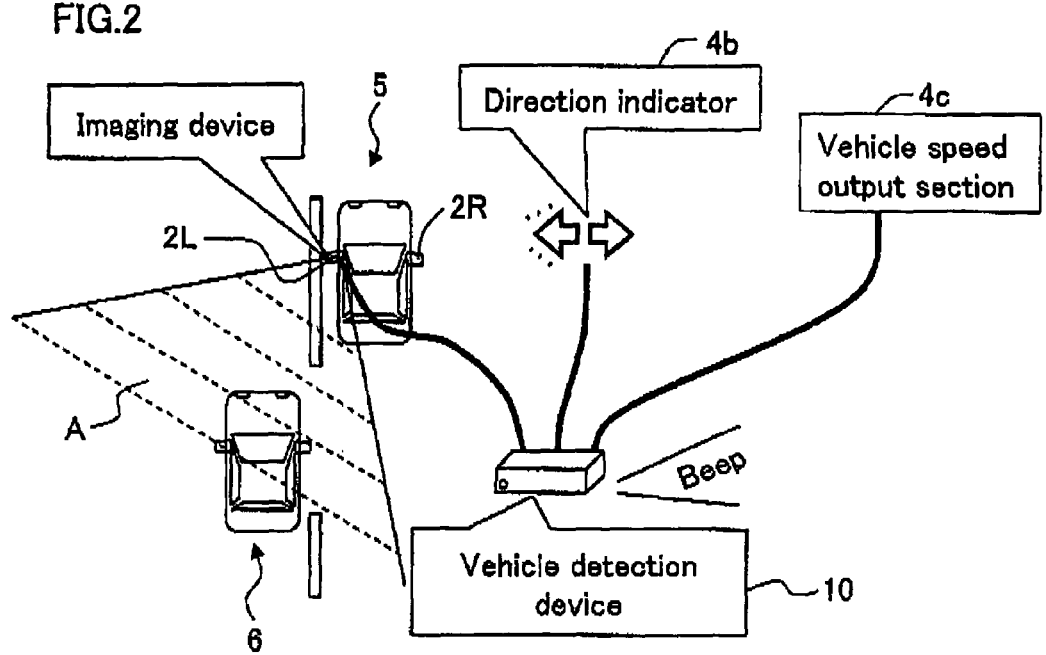
FIG. 2 is a plan view schematically showing an example of how the vehicle environment monitoring device 1 is attached to an automobile, together with an environment thereof.

FIG. 1 is a block diagram showing an exemplary partial structure of a vehicle environment monitoring device 1 according to an example of the present invention. FIG. 2 is a plan view schematically showing the vehicle environment monitoring device 1 mounted on an automobile in one example, together with an environment thereof.

As shown in FIG. 1, the vehicle environment motoring device 1 according to this example includes an imaging section 2 for taking images of the environment of a subject or first vehicle 5 (FIG. 2) having the vehicle environment motoring device 1 mounted thereon, a calculation processing section 3 for performing alarm detection calculation processing for detecting that a second vehicle 6 (FIG. 2) is approaching as described in detail below based on the images of the environment of the subject vehicle 5, an approach notification section 4a for alarming the driver of the subject vehicle 5 based on the alarm detection information from the calculation processing section 3, a direction indicator 4b for outputting a direction indication signal, and a vehicle speed information output section 4c for outputting a vehicle speed.

The imaging section 2 includes a right side imaging section 2R and a left side imaging section 2L. In the example shown in FIG. 2, one right side imaging section 2R is attached to a right door mirror, and one left side imaging section 2L is attached to a left door mirror. The right side imaging section 2R and the left side imaging section 2L is each a camera such as an analog output camera or a digital output camera, and take images of at least two types of colors of the environment of the subject vehicle S. In FIG. 2, the right side imaging section 2R and the left side imaging section 2L are respectively attached, as the imaging sections, to side positions (door mirrors) at which images of the right rear environment and the left rear environment of the subject vehicle 5 can be taken. For example, the left side imaging section 2L takes images of the left rear environment, which is area A represented by oblique lines. The imaging section 2 may be attached to a top or bottom part of the mirror or built in the vicinity thereof or inside the mirror. The imaging section 2 may be attached at any position, for example, near the fender mirror, as long as images of the rear environment of the subject vehicle 5 can be taken. In the case where, for example, the imaging section 2 is built in the door mirror, the imaging section 2 is set in the housing thereof such that the direction imaging is not changed even when the angle of the mirror is changed. Regarding the height at which the imaging section 2 is attached, the height of the door mirror or the vicinity thereof is preferable in order to always encompass the border between the windshield and the hood of the second vehicle 6 in a specific area described in detail below. By attaching the imaging section 2 at this height or the vicinity thereof, the moving state of the second vehicle 6 behind the subject vehicle 5 can be imaged without changing the specific area, and whether the second vehicle 6 is far from or close to the subject vehicle 5. A plurality of imaging sections may be attached to the right of the subject vehicle 5 and a plurality of imaging sections may be attached to the left of the subject vehicle 5. Alternatively, one imaging section may be attached at a position at which images of both the right and left environments can be taken. The "second vehicle 6" is another vehicle approaching the subject vehicle 5 from behind. In the case where the imaging section 2 is an analog output camera, the analog image is converted into a digital signal by an A/D converter (not shown) before the image data is input to the calculating processing section 3.

The calculating processing section 3 includes a specific area setting section 31 as a setting section, an input image switching section 32a, an image processing section 32b as an extraction section, a memory section 33, an approach detection threshold setting section 34, and an approach detection section 35 as a detection section. The calculating processing section 3 receives the image data taken by the imaging section 2, information indicating an operation state of the direction indicator 4b (direction indication signal) and information on the vehicle speed from the subject vehicle 5. Based on the image data taken by the imaging section 2, the calculating processing section 3 performs calculation processing for detecting the second vehicle 6 which is present in the environment of the subject vehicle 5.

The specific area setting section 31 sets a specific area which is sufficiently smaller than the images taken by the imaging section 2. The specific area is an area (detection area) which is first subjected to processing for detecting the moving state of the second vehicle 6 present in the environment of the subject vehicle 5 by the image processing section 32b and the approach detection section 35. The specific area, which is a part of the image taken by the imaging section 2, is set as a strip-shaped rectangular area which is longer in, and parallel to, the horizontal direction of the frame image and includes at least two types of colors. The specific area is set for the purpose of significantly reducing the calculation amount and enabling real-time and effective calculation processing.

The input image switching section 32a supplies the image processing section 32b with the image data which is input from the right side imaging section 2R or the image data which is input from the left side imaging section 2L by switching the image data in accordance with the operation state information (direction indication signal) of the direction indicator 4b supplied from the subject vehicle S. When, for example, the direction indicated by the direction indicator 4b is right, the image data of the right rear of the subject vehicle 5 taken by the right side imaging section 2R is supplied to the image processing section 32b. When the direction indicated by the direction indicator 4b is left, the image data of the left rear of the subject vehicle 5 taken by the left side imaging section 2L is supplied to the image processing section 32b. By such an operation, the subsequent sections perform processing for detecting the second vehicle 6 which is present at the right rear or left rear of the subject vehicle 5 which is indicated by the direction indicator 4b.

The image processing section 32b obtains the image data of the specific area which is set by the specific area setting section 31 for each of a plurality of frame images taken by the imaging section 2. Based on the obtained image data of the specific area and the vehicle speed information of the subject vehicle 5 from the vehicle speed information output section 40, the image processing section 32b extracts moving vector information by extraction processing described below. The extraction processing of the moving vector information will be described below in detail with reference to FIG. 7.

Figure 3:
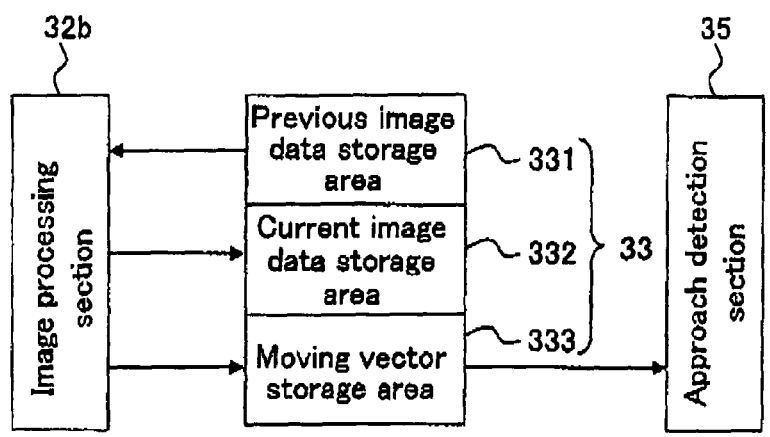
FIG. 3 is a block diagram showing an exemplary structure of a memory section shown in FIG. 1.

The memory section 33 temporarily stores the result of the extraction processing performed by the image processing section 32b. As shown in FIG. 3, the memory section 33 includes, for example, a previous image data storage area 331, a current image data storage area 332, and a moving vector storage area 333. The previous image data storage area 331 and the current image data storage area 332 are switched for each image by switching the memory address. In this specification, the term "previous image data" refers to the data immediately previous to the current image data.

The approach detection threshold setting section 34 sets an approach detection threshold as a determination threshold value for determining a relative moving state (positional relationship) between the subject vehicle 5 and the second vehicle 6.

The approach detection section 35 detects the moving state of the second vehicle 6 present in the environment of the subject vehicle 5 by the processing described below based on the moving vector information which is extracted by the image processing section 32b and stored in the memory section 33. Thus, the approach detection section 35 detects the second vehicle 6 approaching the subject vehicle 5 or the second vehicle 6 moving at the same speed as the subject vehicle 5 by the determination threshold value which is set by the approach detection threshold setting section 34. The detection result obtained by the calculation processing section 3 is supplied to the approach notification section 4a together with the operation information provided by the direction indicator 4b. The approach detection section 35 determines whether the relative moving state (positional relationship) between the subject vehicle 5 and the second vehicle 6 is dangerous or not based on the determination threshold value which is set by the approach detection threshold setting section 34. When the relative moving state (positional relationship) between the subject vehicle 5 and the second vehicle 6 exceeds the determination threshold value, alarm detection information is output to the approach notification section 4a as the determination result of the approach detection section 35. The detection processing on the relative moving state of the subject vehicle 5 and the second vehicle 6 will be described below in detail with reference to FIG. 8.

The approach notification section 4a generates an alarm sound or displays an alarm indication so as to alarm the driver or the like of the subject vehicle 5 of the danger, based on the moving state of the second vehicle 6 detected by the approach detection section 35 and the operation information from the direction indicator 4b, for example, based on the alarm detection information, which is output when, for example, the subject vehicle 5 is moving right or left and the second vehicle 6 is close enough to have a danger of contact or collision (when the determination threshold value is exceeded).

The calculation processing section 3 and the approach notification section 4a are, for example, packaged as a vehicle detection device 10 shown in FIG. 2 and accommodated in a front part of the automobile on the driver's seat side. By such setting, the driver can easily check the alarm (sound or display).

Hereinafter, a vehicle environment monitoring method performed using the vehicle environment monitoring device 1 according to this example having the above-described structure will be described.

Figure 5A:
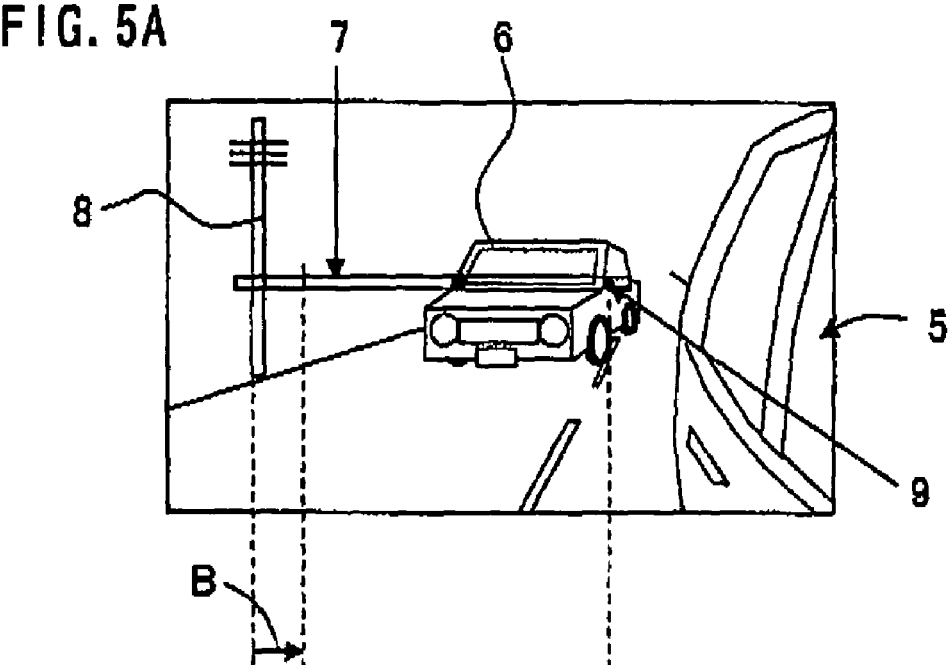
FIG. 5A schematically shows an image of the environment of the vehicle having the vehicle environment monitoring device mounted thereon taken by the imaging section shown in FIG. 1 when another vehicle is running at the same speed as the vehicle.
Figure 5B:
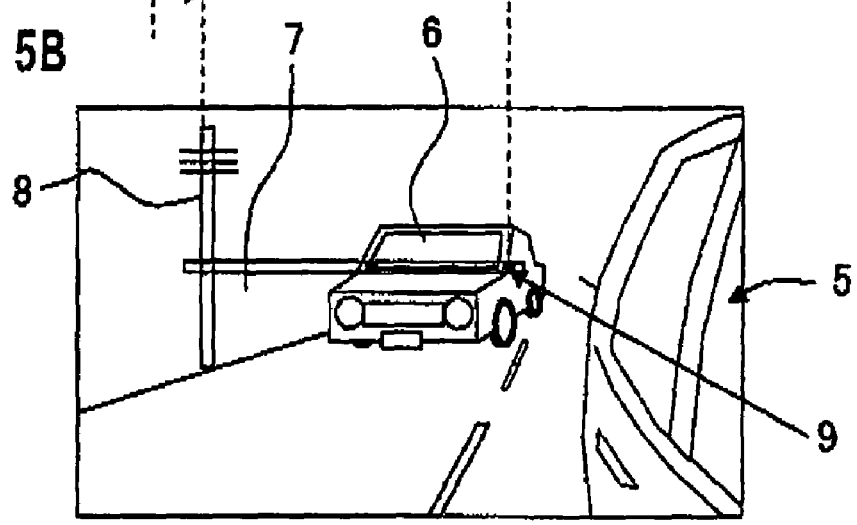
FIG. 5B schematically shows an image of the environment of the vehicle having the vehicle environment monitoring device mounted thereon taken by the imaging section shown in FIG. 1 time t after the image of FIG. 5A when the vehicle moved forward.

FIG. 4A schematically shows an image of the environment of the subject vehicle 5 taken by the imaging section 2 shown in FIG. 1 when the second vehicle 6 is approaching the subject vehicle 5. FIG. 4B schematically shows an image of the environment of the subject vehicle 5 taken by the imaging section 2 at time t after the image of FIG. 4A when the subject vehicle 5 moved forward. FIG. 5A schematically shows an image of the environment of the subject vehicle 5 taken by the imaging section 2 shown in FIG. 1 when the second vehicle 6 is running at the same speed as the subject vehicle 5. FIG. 5B schematically shows an image of the environment of the subject vehicle 5 taken by the imaging section 2 at time t after the image of FIG. 5A when the subject vehicle 5 moved forward.

Figure 6A:
FIGS. 6A through 6D show exemplary rectangular or other shapes usable for a specific area in FIG. 4A.
Figure 6B:
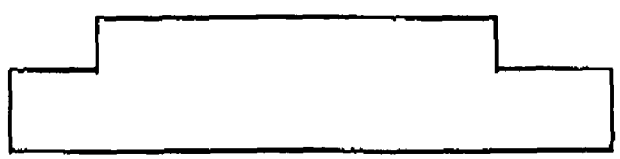
Figure 6C:
Figure 6D:

In FIGS. 4A, 4B, 5A and 5B, images of the right rear of the subject vehicle 5 are taken by the right side imaging section 2R. These images show the second vehicle 6 approaching to, or running at the same speed as, the subject vehicle 5. A specific area 7 crossing the second vehicle 6 horizontally is an image area set by the specific area setting section 31. The specific area, which is a part of the image taken by the imaging section 2, is set as a strip-shaped rectangular area which is longer in, and parallel to, the horizontal direction of the frame image and includes at least two types of colors. The specific area 7 is set so as not to encompass the image of the subject vehicle 5 and to encompass at least a part of the image of the second vehicle 6. As the two types of colors, images of the windshield and the hood of the second vehicle 6 are specified. The specific area 7 is processed by the image processing section 32b and the approach detection section 35, and thus the vehicle 6 approaching the subject vehicle 5 or running at the same speed as the subject vehicle 5 is detected. The specific area 7 is not limited to a regular rectangle as shown in FIG. 6A, and may be have a strip shape changed from the rectangle as shown in FIGS. 6B through 6D, depending on the size or shape of the second vehicle 6. As shown in FIGS. 4A, 4B, 5A and 5B, the specific area 7 is preferably set so as to encompass the border between the windshield and the hood of the second vehicle 6. The reason for setting the specific area 7 so as to encompass the border between the windshield and the hood is that, as a result of dividing the specific area 7 into a plurality of divided areas and processing the plurality of divided areas, the sum of each of the plurality of divided areas should not be equal to one another, i.e., the specific area 7 should not be have one, fixed single color. In the case where the position of the imaging section 2 is attached to the outside of the door mirror or built in the door mirror, the imaging section 2 is set horizontally with respect to subject vehicle 5 and the specific area 7 is set at the center of the frame image in the vertical direction.

In FIGS. 4A and 4B, a still object such as, for example, a utility pole 8 is imaged as if it moved to the right time t later as indicated by arrow B. By contrast, an object approaching the subject vehicle 5, such as the second vehicle 6, is imaged as if it moved to the left time t later as indicated by arrow C regarding a position 9 of the left end of the second vehicle 6 (the right end in FIGS. 4A and 4B). Accordingly, the moving direction (moving vector) on the specific area 7 is different between the object approaching the subject vehicle 5 (the second vehicle 6) and the fixed, still object (for example, the utility pole 8). Therefore, using such a moving vector, the moving state of the second vehicle 6 approaching the subject vehicle 5 can be accurately detected without obtaining the extinction point or the white line, or using the optical flow, as is required by the conventional art.

Similarly, in FIGS. 5A and 5B, an object moving at the same speed as the subject vehicle 5 (e.g., the second vehicle 6) is imaged as if it stayed at the same position time t later as the position 9 of the left end of the second vehicle 6 (the right end in FIGS. 5A and 5B). The vehicle 6 running at the same speed as the subject vehicle 5 is also a target of detection because there is a danger of contact or collision at the time of changing lanes.

Next, the extraction processing of the moving vector information performed by the image processing section 32b will be described with reference to FIG. 7.

FIG. 7 is a flowchart illustrating the extraction processing of the moving vector information performed by the image processing section 32b shown in FIG. 1.

As shown in FIG. 7, in step S1, the specific area 7 is set by the specific area setting section 31 for the image taken by the imaging section 2. As shown in FIGS. 4A, 4B, 5A and 5B, the specific area 7 is set as a strip-shaped rectangular area which is longer in, and parallel to, the horizontal direction of the frame image. The height of the specific area 7 is set such that the specific area 7 encompasses at least two types of colors. In this example, the specific area 7 is set to encompass the border between the windshield and the hood of the second vehicle 6. Alternatively, the specific area 7 may be set to encompass a tip of the hood or the border between the windshield and the roof, as long as at least two types of colors are included. The position of the specific area 7 in the right-left direction is set such that the specific area 7 does not encompass the image of the subject vehicle 5 and encompasses at least a part of the image of the second vehicle 6.

In step S2, a direction indication signal representing the operation state of the direction indicator 4b is read by the input image switching section 32b. In step S3, the image data is switched such that, among the image data taken by the right side imaging section 2R and the left side imaging section 2L, the image data corresponding to the direction indicated by the direction indicator 4b (direction indication signal) is supplied to the image processing section 32b. In this example, only the image data in the direction indicated by the direction indicator 4b is supplied to the image processing section 32b. Alternatively, image data of both sides may be supplied to the image processing section 32b regardless of the operation state of the direction indicator 4b.

In step S4, in order to find the moving vector in the specific area 7, the specific area 7 is divided into a plurality of divided areas, and a sum of the image data of each divided area is calculated. As the image data to be added together to obtain the sum, a luminance signal, for example, is usable. Alternatively, an R, G, B, Y, U, or V color signal may be usable. Still alternatively, all the color signals may be usable. The specific area 7 may be divided into many divided areas in accordance with the calculation capability of the image processing section 32b, but each divided area preferably has a size of 8 pixels×8 pixels in order to prevent detection error due to noise.

In step S6, the sum of each of the plurality of divided areas of the current image data is stored, for each divided area, in the current image data storage area 332 of the memory section 33 shown in FIG. 3.

In step S7, sum data stored in the memory section 33 for each divided area time t before the current image data is read from the previous data storage area 331 of the memory section 33 shown in FIG. 3.

In step S8, the sum data of the previous image data and the sum data of the current image data are compared with each other. A divided area of the previous image data, the sum data of which has the minimum difference from the sum data of each divided area of the current image data, is extracted. A divided area of the previous image data, the sum of which has the minimum difference from the sum data of a certain divided area of the current image data is considered to be at the position at which the certain divided area existed time t before. In this example, the previous image data is time t before the current image data. Alternatively, image data which is several images before the current image data may be set as the image data time t before the current image data.

In step S9, the vehicle speed information output section 4c supplies the vehicle speed information to the image processing section 32b, and the image processing section 32b determines whether the subject vehicle 5 is currently running or not. When the subject vehicle 5 is determined to be currently running in step S9 (YES), there is a danger of contact or collision even when the second vehicle 6 is running at the same speed as the subject vehicle 5. Therefore, the processing goes to step S10 where the approach threshold value is set to "−1". When the subject vehicle 5 is determined to be at a stop in step S9 (NO), it is only required to detect the second vehicle 6 approaching the subject vehicle 5. Therefore, the processing goes to step S11 where the approach threshold value is set to "0". In this example, the threshold value is "−1" or "0". These values are not fixed, and may be changed in accordance with the situation. In this example, the approach threshold value is set in accordance with whether the subject vehicle 5 is running or not. Alternatively, more threshold values may be set in accordance with the running speed of the subject vehicle 5.

In step S12, the positional relationship between the position of the divided area extracted in the previous image data in step S8 and the position of the corresponding divided area in the current image data is compared with the approach threshold value set in step S10 or step S11. When the value of "the position in the previous image data−the position in the current image data" is larger than the approach threshold value in step S12 (YES), the processing goes to step S13 where "close" is stored in the moving vector storage area 333 of the memory section 33 shown in FIG. 3 for each divided area. When the value of "the position in the previous image data−the position in the current image data" is equal to or smaller than the approach threshold value in step S12 (NO), the processing goes to step S14 where "far" is stored in the moving vector storage area 333 of the memory section 33 shown in FIG. 3 for each divided area.

The state "close" means that, when the subject vehicle 5 is currently running, there is an object (the second vehicle 6) determined to be running at the same speed as the subject vehicle 5 as described above with reference to FIGS. 5A and 5B or there is an object (the second vehicle 6) determined to be approaching the subject vehicle 5 as described above with reference to FIGS. 4A and 4B, in a divided area of the specific area 7 in the direction indicated by the direction indicator 4b. When the subject vehicle 5 is at a stop, the state "close" means that there is an object (the second vehicle 6) determined to be approaching the subject vehicle 5 in a divided area of the specific area 7 as described above with reference to FIGS. 4A and 4B.

The state "far" means that, when the subject vehicle 5 is currently running, there is no object (the second vehicle 6) determined to be running at the same speed as the subject vehicle 5 or there is no object (the second vehicle 6) determined to be approaching the subject vehicle 5, in a divided area of the specific area 7. When the subject vehicle 5 is at a stop, the state "far" means that there is no object (the second vehicle 6) determined to be approaching the subject vehicle 5 in a divided area of the specific area 7. In this example, "close" or "far" is determined only based on the moving direction as the moving vector information. Alternatively, the relative speeds of the subject vehicle 5 and the second vehicle 6 may be obtained using an moving vector amount.

In step S15, it is determined whether a processing termination instruction is input from the driver or not. Until the processing termination instruction is input from the driver, the processing in steps S2 through 14 is repeated. When the processing termination instruction is input from the driver (YES in step S15), the processing is terminated.

Next, the detection processing of the moving state of the second vehicle 6 with respect to the subject vehicle 5 performed by the approach detection section 35 will be described in detail with reference to FIG. 8.

FIG. 8 is a flowchart illustrating the detection processing of the moving state of the second vehicle 6 with respect to the subject vehicle 5 performed by the approach detection section 35.

As shown in FIG. 8, in step S21, an approach detection threshold value (determination threshold value) is set by the approach detection threshold value setting section 34. The approach detection threshold value is preset by the approach detection threshold value setting section 34 based on, for example, the size or position of the second vehicle 6. Usually, the approach detection threshold value is preferably set to be about a half of the number of divided areas of the specific area 7 based on, for example, the size of the second vehicle 6 or the distance of the second vehicle 6 from the subject vehicle 5.

In step S22, the moving vector information written in the moving vector storage area 333 of the memory section 33 by the image processing section 32b is read to the approach detection section 35.

In step S23, the moving vector information which has been read is determined to be "close" or "far". When the moving vector information is "close on the left" in step S23 (YES), the processing goes to step S24 where an approach direction vector value is added. When the moving vector information is "far" in step S23 (NO), the processing goes to step S25.

In step S25, the processing in steps S22 through S24 is repeated for each of all the divided areas of the specific area 7. By this processing, the approach direction vector value from time t ago until the present (the sum of the approach direction vector values) is calculated.

In step S26, when the calculated approach direction vector value (the sum) is larger than the approach detection threshold value (determination threshold value) set in step S21, it is determined that there is the second vehicle 6 approaching the subject vehicle 5 in the direction indicated by the direction indicator 4b.

In step S27, the approach notification section 4a generates an alarm sound or displays an alarm indication so as to alarm the driver of the subject vehicle 5 of the danger. In this example, when the second vehicle 6 is approaching the subject vehicle 5, an alarm sound or an alarm indication display is output so as to notify the driver of the danger of contact or collision. Alternatively, the alarm sound or the alarm indication display may be output before this stage when the situation is still safe. Instead of the alarm sound or the alarm indication display, the alarm is output by means of video, light, vibration, heat or the like. By such an alarm notification, the driver can learn the danger of contact or collision between the subject vehicle 5 and the second vehicle 6 and thus can avoid a contact or collision accident. In this example, the alarm is notified to the operator (driver) of the subject vehicle 5. Alternatively, the alarm may be notified to the operator (driver) of the second vehicle 6. The target of the notification may include both the operators (drivers) of the subject vehicle 5 and the second vehicle 6, or include other individuals (individuals in the environment). Furthermore, in this example, the second vehicle 6 approaching the subject vehicle 5 is detected. Alternatively, a vehicle running away from the subject vehicle 5 may be detected.

In step S28, it is determined whether a processing termination instruction is input from the driver or not. Until the processing termination instruction is input from the driver, the processing in steps S22 through 27 is repeated. When the processing termination instruction is input from the driver (YES in step S28), the processing is terminated.

As described above, according to the vehicle environment monitoring device and the vehicle environment monitoring method using the same of the present invention, in an image taken by the imaging section 2, the specific area setting section 31 sets a specific area 7 which is a strip-shaped rectangular area longer in, and parallel to, the horizontal direction of the frame image and encompasses the border between the hood and the windshield of the second vehicle 6. The image processing section 32*b* takes out image data of the specific area 7 in units of one frame image or in units of a plurality of frame images and extracts a moving vector from the image data which has been taken out. When a sum of vector values in the approach direction, of the moving vector information, is larger than the threshold value set by the approach detection threshold value setting section 34, the approach detection section 35 determines that the second vehicle 6 is approaching the subject vehicle 5, and the approach notification section 4*a* outputs an alarm sound or an alarm indication display so as to notify the driver of the subject vehicle 5 of the danger.

Figure 11:
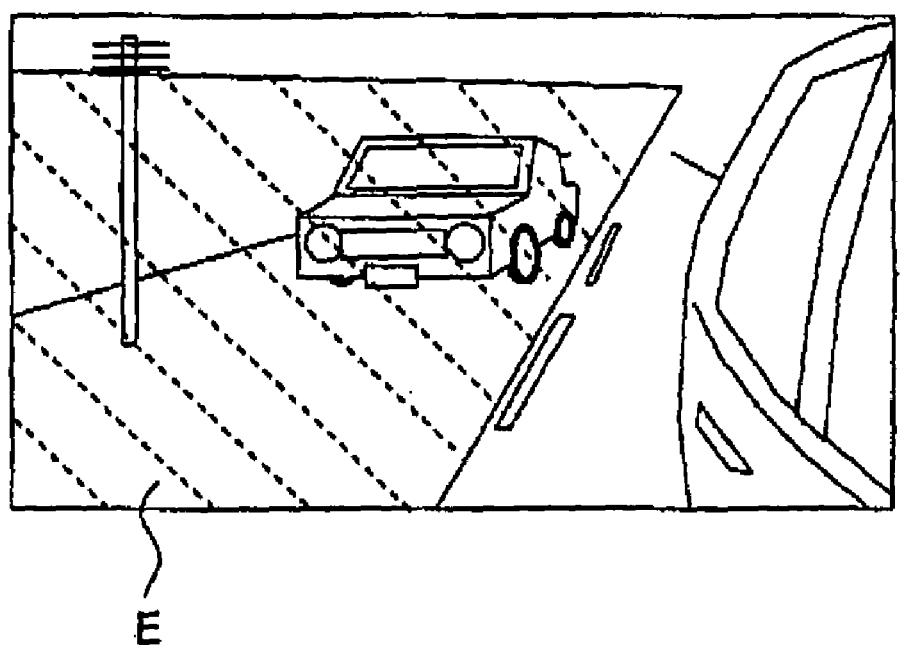
FIG. 11 schematically shows a detection area by the conventional art.

In this manner, the second vehicle 6 present in the environment of the subject vehicle 5 can be accurately detected in real time, without requiring highly sophisticated, or a large amount of, calculations as required conventionally. When there is a danger of a contact or collision accident, the driver can be notified of the danger. Thus, the danger can be avoided. For example, according to the conventional art, an area as large as a half of the image plane is set as a detection area B as represented by the oblique lines in FIG. 11. In this example, as shown in FIGS. 4A, 4B, 5A and 5B, the calculation can be performed on the specific area 7, which is about 1/40 of the detection area E. Therefore, the amount of processing can be significantly reduced while improving the detection accuracy.

Figure 9A:
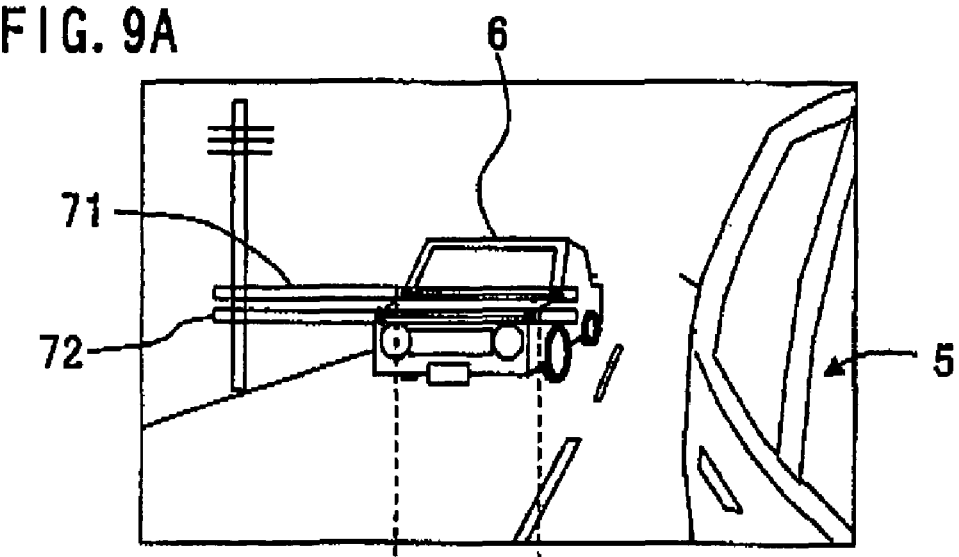
FIG. 9A schematically shows an image of the environment of the vehicle having the vehicle environment monitoring device mounted thereon taken by the imaging section shown in FIG. 1 in the case where a plurality of specific areas are set.
Figure 9B:
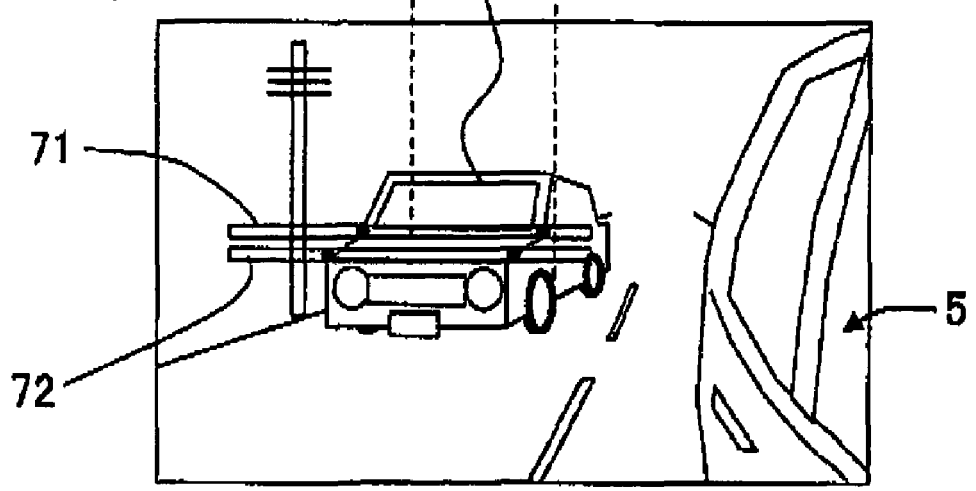
FIG. 9B schematically shows an image of the environment of the vehicle having the vehicle environment monitoring device mounted thereon taken by the imaging section shown in FIG. 1 time t after the image of FIG. 9A.

In this example, the specific area 7 is set as one strip-shaped rectangular area which is longer in, and parallel to, the horizontal direction of the image plane and which does not encompass the image of the subject vehicle 5 but encompasses at least the border between the windshield and the hood of the second vehicle 6. The specific area 7 is not limited to this. As shown in FIGS. 9A and 9B, two, upper and lower specific areas 71 and 72 may be set as follows with the above-described conditions. The specific areas 71 and 72 are strip-shaped rectangular areas which are longer in the horizontal direction of the image plane. In the example shown in FIGS. 9A and 9B, two, upper and lower specific areas 71 and 72 are set. Alternatively, more specific areas 7 (a plurality of specific areas 7) may be set. The size or position of the specific areas 71 and 72 may be changed in accordance with the shape of the vehicle. In the case where a plurality of specific areas 7 are set, the first specific area 71 may be set so as to encompass the border between the windshield and the hood, and the second specific area 72 may be set so as to encompass a tip of the hood. Both the first specific areas 71 and 72 may include two types of colors and does not have one fixed color.

When a plurality of specific areas 7 are set, the extraction processing of the moving vector information illustrated in FIG. 7 and the detection processing of the second vehicle 6 illustrated in FIG. 8 are performed for each specific area (for example, the specific area 71 and the specific area 72).

However, in the case where the two specific areas 71 and 72 are parallel in the horizontal direction and positionally offset only in the vertical direction as shown in FIGS. 9A and 9B, the second vehicle 6 has moving vectors in the same direction in the specific areas 71 and 72 although the positions of the moving vectors in the vertical direction are different. Therefore, it is preferable to use a method illustrated in FIG. 10. According to the method in FIG. 10, when the moving vectors of two divided areas, the positions of which are the same in the horizontal direction but different in the vertical direction, are in the same direction, it is determined that there is a moving vector in the approach direction (the detection accuracy is improved) and the moving vector values are added. Hereinafter, the method shown in FIG. 10 will be described step by step.

FIG. 10 is a flowchart illustrating an example of approach detection processing performed by the approach detection section 35 shown in FIG. 1 in the case where a plurality of specific areas 7 are set as in FIGS. 9A and 9B.

As shown in FIG. 10, in step S31, an approach detection threshold value (determination threshold value) is set by the approach detection threshold value setting section 34. The approach detection threshold value is preset by the approach detection threshold value setting section 34 based on, for example, the size or position of the second vehicle 6. Usually, the approach detection threshold value is preferably set to be smaller than that in the case where one specific area 7 is set.

In step S32, moving vector information (A) written in the moving vector storage area 333 of the memory section 33 by the image processing section 32*b* on the first specific area (for example, the specific area 71 in FIGS. 9A and 9B) is read to the approach detection section 35.

In step S33, moving vector information (B) written in the moving vector storage area 333 of the memory section 33 by the image processing section 32*b* on a divided area of the second specific area (for example, the specific area 72 in FIGS. 9A and 9B), the position of which is the same as in the horizontal direction but is different in the vertical direction from the divided area which has been read in step S32, is read to the approach detection section 35.

In step S34, it is determined whether or not the moving vector information read in step S32 matches the moving vector information read in step S33 (A=B) and the moving vectors are directed in the approach direction (indicating that the vehicle 5 and the second vehicle 6 are approaching to each other). When the moving vectors match each other and are directed in the approach direction in step S34 (YES), the processing goes to step S35 where the approach direction vector values are added. When the moving vectors do not match each other, or when the moving vectors match each other but are not directed in the direction of separating from each other instead of in the approach direction in step S35 (NO), the processing goes to step S36. By adding approach direction vector values only when the moving vectors match each other as described above, a wrong determination is not made even when an error occurs in detecting the vector direction due to noise or light reflection.

In step S36, the processing in steps S32 through S35 is repeated for each of all the divided areas of the specific areas. By this processing, the approach direction vector value from time t ago until the present (the sum of the approach direction vector values) is calculated.

In step S37, when the calculated approach direction vector value (the sum) is larger than the approach detection threshold value (determination threshold value) set in step S31, it is determined that the second vehicle 6 is approaching the subject vehicle 5.

In step S38, the approach notification section 4a generates an alarm sound or displays an alarm indication so as to alarm the driver of the subject vehicle 5 of the danger.

In step S39, it is determined whether a processing termination instruction is input from the driver or not. Until the processing termination instruction is input from the driver, the processing in steps S32 through 38 is repeated. When the processing termination instruction is input from the driver (YES in step S39), the processing terminated.

As described above, by setting a plurality of specific areas, the detection errors due to the difference in the size or shape of the vehicles as the detection target (the second vehicles 6) can be reduced and the detection accuracy can be further improved.

Although not specifically described in the above example, the present invention can be carried out by software. In this case, the calculation processing section 3 shown in FIG. 1 is accommodated in a controller (a controlling section including a CPU) for controlling the entirety of the device. A control program for causing a computer to carry out the processing illustrated in the flowcharts of FIGS. 7, 8 and 10, and data thereof are stored in a memory (not shown), such as a hard disc or the like in the controller, as a computer-readable recording medium. The control program and the data can be read from the memory to a work memory in the controller, so as to execute the control program.

The computer-readable recording medium may be, for example, a hard disc, any of various IC memories, an optical disc (e.g., a CD), or a magnetic recording medium (e.g., an FD). The control program and the data which have been read are stored in a RAM as a work memory in the controller and executable by the CPU (control section) in the controller.

The detection section of the control section (CPU) includes a dividing section (not shown) for dividing the image data of the specific area which has been taken in into a plurality of divided areas, wherein the image data of the specific area is either image data taken by a right side imaging section or image data taken by a left side imaging section which is selected by switching in accordance with a direction indicated by a direction indicator; a sum calculation section (not shown) for calculating a sum of image data values of each of the plurality of divided areas; a divided area extraction section for extracting a divided area of the previous image data, a sum of which has a minimum difference from a sum of each of the plurality of divided areas of the current image data; a running determination section (not shown) for determining whether the first vehicle is running or not based on vehicle speed information from the first vehicle; an approach threshold value setting section (not shown) for setting one of two threshold values as a predetermined threshold value when the first vehicle is running, and setting the other threshold value as the predetermined threshold value when the first vehicle is not running; and a moving vector information determination section (not shown) for comparing the predetermined threshold value with a positional relationship between the position of the extracted divided area of the previous image data and the position of the extracted divided area of the current image data; when a value of the positional relationship is larger than the predetermined threshold value, determining the moving vector information as approaching vector information; and when the value of the positional relationship is equal to or smaller than the predetermined threshold value, determining the moving vector information as separating vector information.

The detection section of the control section includes a moving vector value calculation section (not shown) for detecting whether the moving vector information indicates "close" or "far" in each of the plurality of divided areas, and when the moving vector information indicates "close", adding a vector value in an approach direction; and a second vehicle determination section for, when the sum of the vector values in the approach direction is larger than a determination threshold value, determining that there is the second vehicle approaching the first vehicle and/or there is the second vehicle running at the same speed as the first vehicle. These functions are performed based on the control program.

The present invention is directed to a vehicle environment monitoring device usable for performing monitoring for safety when a two-wheel vehicle such as a motorbike or a bicycle, or a four-wheel vehicle such as an automobile, which has the vehicle environment monitoring device mounted thereon moves; for example, usable for, when such a vehicle moves right or left for the purpose of turning left or turning right or for changing lanes, notifying the driver of the vehicle by means of an alarm that there is a danger of the vehicle contacting or colliding against another vehicle present in the environment thereof and thus supporting safety confirmation; a vehicle environment monitoring method using the same; a control program for causing a computer is to carry out the vehicle environment monitoring method; and a computer-readable recording medium having the control program recorded thereon. According to the present invention, highly accurate real-time detection of the moving state of another vehicle present in the vehicle having the vehicle environment monitoring device mounted thereon can be performed without requiring highly sophisticated, or a large amount of, calculations. Thus, when there is a danger of a contact or collision accident, such a danger can be notified to the driver. Therefore, the present invention is widely usable for vehicle safety systems or traffic systems so as to prevent contact or collision accidents.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A vehicle environment monitoring device, comprising:
    an imaging section for taking image data of an environment of an automobile, the image data including at least two colors;
    a setting section for setting a specific area of the image data obtained by the imaging section, wherein the specific area has a strip shape longer in, and parallel to, a horizontal direction of a frame image and includes at least two colors;
    an extraction section for taking in image data of the specific area in units of one or a plurality of frame images taken by the imaging section in time series and extracting moving vector information based on the image data of the specific area; and
    a detection section for detecting a second vehicle which is present in an environment of a first vehicle having the vehicle environment monitoring device mounted thereon, based on the moving vector information.

2. A vehicle environment monitoring device according to claim 1, wherein the specific area including the two colors encompasses a border between a windshield and a hood of the second vehicle.

3. A vehicle environment monitoring device according to claim 1, wherein the setting section sets the specific area of the image data obtained by the imaging section, such that the specific area does not encompass an image of the first vehicle and to encompass at least a part of the second vehicle.

4. A vehicle environment monitoring device according to claim 1, wherein:
the setting section sets a plurality of specific areas of the image data taken by the imaging section, wherein positions of the plurality of specific areas are the same in the horizontal direction and different in a vertical direction;
the extraction section takes in the image data of each of the specific areas and extracting moving vector information; and
the detection section adds vector values in an approach direction when the moving vector information in each of the plurality of specific areas represents the approach direction, and determining that there is at least one of the second vehicle approaching the first vehicle and the second vehicle running at the same speed as the first vehicle when a total sum of all the plurality of divided areas is larger than a predetermined threshold value.

5. A vehicle environment monitoring device according to claim 1, wherein the imaging section is attached to the first vehicle.

6. A vehicle environment monitoring device according to claim 5, wherein the imaging section is attached to such a position that the imaging section is capable of taking an image of at least one of a left rear environment and a right rear environment of the first vehicle.

7. A vehicle environment monitoring device according to claim 6, further comprising an input image switching section switchable to select either image data from a right side imaging section or image data from a left side imaging section, and supplying the selected image data to the extraction section.

8. A vehicle environment monitoring device according to claim 1, wherein the extraction section compares a sum of current image data and a sum of previous image data time t before (t>0) for each of a plurality of divided areas obtained by dividing the specific area, extracting a divided area of the current image data and a divided area of the previous image data which have a minimum difference between the sums thereof, determining that the position of the extracted divided area of the previous image data is the position of the extracted divided area of the current image data time t before, and extracting a positional relationship between the extracted divided area of the previous image data and the extracted divided area of the current image data as the moving vector information.

9. A vehicle environment monitoring device according to claim 8, wherein the extraction section includes:
a dividing section for dividing the image data of the specific area which has been taken in into a plurality of divided areas, wherein the image data of the specific area is either image data taken by a right side imaging section or image data taken by a left side imaging section which is selected by switching in accordance with a direction indicated by a direction indicator;
a sum calculation section for calculating a sum of image data values of each of the plurality of divided areas;
a divided area extraction section for extracting a divided area of the previous image data, a sum of which has a minimum difference from a sum of each of the plurality of divided areas of the current image data;
a running determination section for determining whether the first vehicle is running or not based on vehicle speed information from the first vehicle;
an approach threshold value setting section for setting one of two threshold values as a predetermined threshold value when the first vehicle is running, and setting the other threshold value as the predetermined threshold value when the first vehicle is not running; and
a moving vector information determination section for comparing the predetermined threshold value with a positional relationship between the position of the extracted divided area of the previous image data and the position of the extracted divided area of the current image data; when a value of the positional relationship is larger than the predetermined threshold value, determining the moving vector information as approaching vector information; and when the value of the positional relationship is equal to or smaller than the predetermined threshold value, determining the moving vector information as separating vector information.

10. A vehicle environment monitoring device according to claim 8, wherein the extraction section compares a predetermined threshold value with the positional relationship between the extracted divided area of the previous image data and the extracted divided area of the current image data, thus determining whether the second vehicle in the divided areas is approaching, separating away from, or running at the same speed as, the first vehicle, and determining the moving vector information.

11. A vehicle environment monitoring device according to claim 10, wherein the extraction section refers to vehicle speed information obtainable from the first vehicle to determine whether the first vehicle is running or not, and when the first vehicle is running, setting the predetermined threshold value to be lower than the threshold value when the first vehicle is not running.

12. A vehicle environment monitoring device according to claim 1, wherein the detection section detects a relative moving state between the first vehicle and the second vehicle based on the moving vector information.

13. A vehicle environment monitoring device according to claim 12, wherein the detection section is capable of detecting that the second vehicle is approaching the first vehicle based on the moving vector information.

14. A vehicle environment monitoring device according to claim 12, wherein the detection section is capable of detecting that the second vehicle is running at the same speed as the first vehicle.

15. A vehicle environment monitoring device according to claim 12, wherein the detection section reads the moving vector information of each of the plurality of divided areas, and when a sum of approach direction vector values, among the moving vector information, is larger than a predetermined threshold value, detecting that there is the second vehicle approaching the first vehicle and/or the second vehicle running at the same speed as the first vehicle.

16. A vehicle environment monitoring device according to claim 1, further comprising a memory section for temporarily storing a result of the extraction performed by the extraction section, wherein the detection section reads the moving vector information from the memory section and uses the moving vector information for the detection.

17. A vehicle environment monitoring device according to claim 12, wherein the detection section includes:
- a moving vector value calculation section for detecting whether the moving vector information indicates "close" or "far" in each of the plurality of divided areas, and when the moving vector information indicates "close", adding a vector value in an approach direction; and
- a second vehicle determination section for, when the sum of the vector values in the approach direction is larger than a determination threshold value, determining that there is the second vehicle approaching the first vehicle and/or there is the second vehicle running at the same speed as the first vehicle.

18. A vehicle environment monitoring device according to claim 12, further comprising an approach notification section for outputting an alarm in accordance with a relative moving state between the first vehicle and the second vehicle, the relative moving state being detected by the detection section.

19. A vehicle environment monitoring device according to claim 18, wherein:
- the detection section detects whether or not there is the second vehicle approaching the first vehicle and/or the second vehicle running at the same speed as the first vehicle in a direction indicated by a direction indicator; and
- the approach notification section outputs an alarm to the environment of the first vehicle when the detection section detects that there is at least one of the second vehicle approaching the first vehicle and/or the second vehicle running at the same speed as the first vehicle in the direction indicated by the direction indicator.

20. A vehicle environment monitoring method, comprising:
- an imaging step of taking image data of an environment of an automobile as frame images in time series, the image data including at least two types of colors;
- a setting step of setting a specific area of the image data in units of one or a plurality of frame images taken by the imaging section, wherein the specific area has a strip shape longer in, and parallel to, a horizontal direction of the frame images and includes at least two types of colors;
- an extraction step of taking in image data of the specific area in units of one or a plurality of frame images taken by the imaging section and extracting moving vector information based on the image data of the specific area; and
- a detection step of detecting a second vehicle which is present in an environment of a first vehicle having the vehicle environment monitoring device mounted thereon, based on the moving vector information.

21. A vehicle environment monitoring method according to claim 20, wherein the extraction step includes the steps of:
- taking in a direction indicated by a direction indicator;
- switching to select either image data taken by a right side imaging section or image data taken by a left side imaging section which corresponds to the direction which has been taken in;
- taking in the image area of the set specific area among the image data of the frame image selected by switching;
- dividing the specific area into a plurality of divided areas;
- calculating a sum of image data values of each of the plurality of divided areas;
- reading sum data stored in a memory section as previous image data time t before for each of the plurality of divided areas;
- comparing a sum of current image data and a sum of the previous image data, and extracting a divided area of the previous image data, a sum of which has a minimum difference from a sum of each of the plurality of divided areas of the current image data;
- determining whether the first vehicle is running or not based on vehicle speed information from the first vehicle;
- setting one of two threshold values as a predetermined threshold value when the first vehicle is running, and setting the other threshold value as the predetermined threshold value when the first vehicle is not running; and
- comparing the predetermined threshold value with a positional relationship between the position of the extracted divided area of the previous image data and the position of the extracted divided area of the current image data; when a value of the positional relationship is larger than the predetermined threshold value, determining the moving vector information as approaching vector information; and when the value of the positional relationship is equal to or smaller than the predetermined threshold value, determining the moving vector information as separating vector information.

22. A vehicle environment monitoring method according to claim 20, wherein the detection step includes the steps of:
- detecting whether the moving vector information indicates "close" or "far" in each of the plurality of divided areas, and when the moving vector information indicates "close", adding a vector value in an approach direction; and
- when the sum of the vector values in the approach direction is larger than a determination threshold value, determining that there is the second vehicle approaching the first vehicle and/or there is the second vehicle running at the same speed as the first vehicle.

23. A control program for causing a computer to carry out a vehicle environment monitoring method according to claim 20.

24. A computer-readable recording medium having a control program according to claim 23 recorded thereon.

* * * * *